Figure 1:
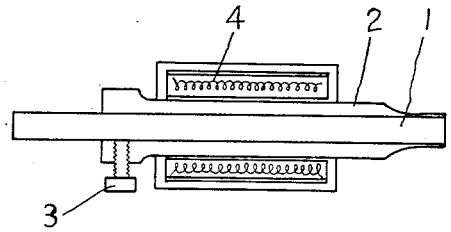

Aug. 7, 1956

I. C. McL. BELL 2,758,191

SOLDERING BIT

Filed Oct. 2, 1951

*Inventor:*
*Ian Charles McLean Bell,*
By Cushman, Darby & Cushman
*Attorneys.*

United States Patent Office 2,758,191
Patented Aug. 7, 1956

2,758,191

SOLDERING BIT

Ian C. McL. Bell, Glasgow, Scotland, assignor to Imperial Chemical Industries Limited, a corporation of Great Britain Application October 2, 1951, Serial No. 249,277

Claims priority, application Great Britain October 19, 1950

2 Claims. (Cl. 219—26)

The present invention relates to a soldering bit the copper core of which is provided on its non-working surface with material which prevents the adhesion or retention of molten solder.

The object of the present invention is to provide a soldering bit of the aforesaid kind which permits a fresh working surface to be formed as required in a manner more convenient than heretofore.

According to the present invention a soldering bit is characterised in that a least the portion of the non-working longitudinal surface of its core in the vicinity of its working surface is provided with a sheath or shroud of material to which molten solder does not adhere and in which the copper core is movable.

The copper core can be adjusted in the sheath or shroud by tapping or by a screw motion. A locking device is also provided in order to fix the copper core within its sheath or shroud after the necessary adjustments have been made.

The material of said sheath or shroud should preferably be eroded less rapidly than the copper by the solder or flux. It should also withstand the temperature employed in the soldering operation. Stainless steel is a suitable material.

It is to be understood that the sheath or shroud need only be a material to which molten solder does not adhere in the vicinity of the working surface of the soldering bit.

The working surface of a plain copper bit or one which has been provided with a thin protective coating of for example aluminium, dissolves relatively quickly in the molten solder and as this action is not uniform the soldering face must be dressed frequently to give the flat soldering surface needed for some soldering operations. The copper also recedes in the soldering bit according to the present invention, the working surface is retained however by the end of the sheath or shroud which is unaffected by the molten solder. It has been found that as long as the depth of the gap formed within the sheath or shroud by the receding copper bit does not exceed about 2 millimetres that sufficient soldering heat is transmitted by the well of solder within the sheath or shroud and in contact with the copper surface. The copper core is then pushed so that its working face is in line with the tip of the sheath or shroud. No further dressing is required until the working surface has again receded to the limit for efficient working. One of the main advantages of the device of the present invention is that the end of the sheath or shroud in the vicinity of the working surface of the copper core can provide a non-varying position in mechanical soldering. In contradistinction to this a plain copper bit or one which is provided with a thin coating of material to which molten solder does not adhere must be frequently adjusted to compensate for its decreasing length.

Three embodiments of the invention are illustrated by way of example with reference to the diagrammatic drawing accompanying the specification whereof Figs. 1 to 4 are sectional elevations of the embodiments embedded in electrical heating means. The same reference numerals refer to like parts throughout.

Referring to Fig. 1 of the drawing, 1 is a copper bit movable in the shroud 2 of stainless steel and capable of being fixed in position within the shroud 2 by a screw 3. The shroud 2 is embedded in the heating means 4.

Figure 2:
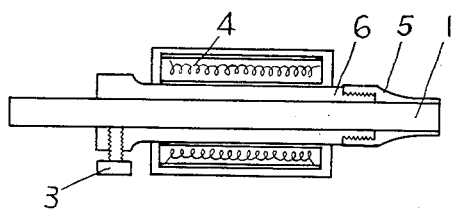

Referring to Fig. 2 of the drawing the copper bit 1 is movable in a shroud 5, 6 and can be fixed in position within the shroud 5, 6 by the screw 3. The portion 5 of the shroud 5, 6 in the vicinity of the working surface of the copper bit 1 is of stainless steel. The rear portion 6 of the shroud 5, 6 is of copper or brass. The shroud 5, 6 is embedded in the heating means 4.

Figure 3:
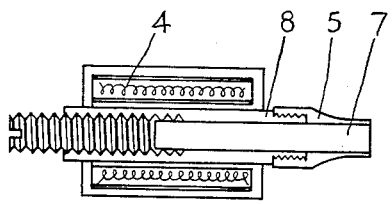

Referring to Fig. 3 of the drawing the screw thread on the copper bit 7 engages a corresponding internal screw thread in the rear portion 8 of the shroud 5, 8. The portion 5 of the shroud 5, 8 is of stainless steel and the rear portion 8 is of brass or copper. The shroud 5, 8 is embedded in the electrical heating means 4.

Figure 4:
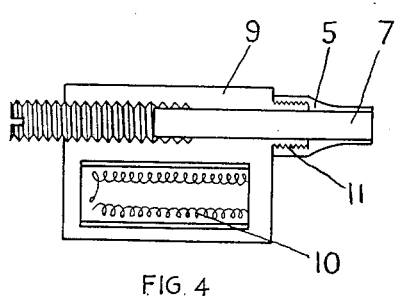

Referring to Fig. 4 of the drawing the screw thread in the copper bit 7 engages the corresponding internal screw thread in the block 9 of brass or copper in which is embedded the electrical heating element 10. The shroud 5 is of stainless steel and is screwed on to the projection 11 on the block 9.

What I claim is:

1. A soldering bit comprising a butt-ended copper core slidably mounted within a copper sheath, a stainless steel sheath secured to said copper sheath adjacent the work end of said core, said stainless steel sheath being in close contact with and covering all but the end working surface of said core, and means connected to said soldering bit whereby said core may be longitudinally fed relative to said stainless steel sheath to compensate for operating wear.

2. In a soldering iron, a soldering bit comprising a butt-ended copper core slidably mounted within a copper sheath, a stainless steel sheath secured to said copper sheath adjacent the work end of said core, said stainless steel sheath being in close contact with and covering all but the end working surface of said core, means connected to said soldering bit whereby said core may be longitudinally fed relative to said stainless steel sheath to compensate for operating wear and electrical heating means thermally connected to said bit.

References Cited in the file of this patent

UNITED STATES PATENTS

| 47,965 | Lewis | May 30, 1865 |
| 294,407 | Schwarz | Mar. 4, 1884 |
| 1,231,749 | Kuhn | July 3, 1917 |
| 1,407,722 | Braun | Feb. 28, 1922 |
| 1,985,492 | Frohmuth | Dec. 25, 1934 |
| 1,988,827 | Bennett | Jan. 22, 1935 |
| 2,187,806 | Moulthrop | Jan. 23, 1940 |
| 2,213,438 | Young | Sept. 3, 1940 |
| 2,331,088 | Went | Oct. 5, 1943 |
| 2,366,910 | Kollath | Jan. 9, 1945 |
| 2,517,561 | Handley | Aug. 8, 1950 |
| 2,592,426 | Jeffrey | Apr. 8, 1952 |

FOREIGN PATENTS

| 306,552 | Great Britain | Feb. 27, 1930 |
| 9,358 | Australia | Sept. 24, 1932 |
| 504,838 | Great Britain | May 2, 1939 |